(12) United States Patent
Krakow et al.

(10) Patent No.: US 10,267,571 B2
(45) Date of Patent: Apr. 23, 2019

(54) THERMAL ENERGY STORAGE SYSTEMS AND METHODS

(71) Applicants: Burton Krakow, Tampa, FL (US); Elias K. Stefanakos, Tampa, FL (US); Dharendra Yogi Goswami, Tampa, FL (US)

(72) Inventors: Burton Krakow, Tampa, FL (US); Elias K. Stefanakos, Tampa, FL (US); Dharendra Yogi Goswami, Tampa, FL (US)

(73) Assignee: University of South Florida, Tampa, FL (US)

(*) Notice: Subject to any disclaimer, the term of this patent is extended or adjusted under 35 U.S.C. 154(b) by 574 days.

(21) Appl. No.: 13/756,098

(22) Filed: Jan. 31, 2013

(65) Prior Publication Data

US 2013/0192792 A1 Aug. 1, 2013

Related U.S. Application Data

(60) Provisional application No. 61/592,911, filed on Jan. 31, 2012.

(51) Int. Cl.
| | |
|---|---|
| F28D 15/00 | (2006.01) |
| F28D 17/00 | (2006.01) |
| F28D 19/00 | (2006.01) |
| F24F 11/00 | (2018.01) |
| F28D 20/00 | (2006.01) |
| F28D 20/02 | (2006.01) |

(52) U.S. Cl.
CPC ........... *F28D 20/025* (2013.01); *F28D 20/02* (2013.01); *F28D 20/026* (2013.01); *F28F 2245/06* (2013.01); *F28F 2265/12* (2013.01); *F28F 2265/14* (2013.01); *Y02E 60/145* (2013.01)

(58) Field of Classification Search
CPC . Y02E 30/145; F28F 2245/06; F28F 2265/12; F28D 20/00; F28D 20/02; F28D 20/026; F28D 20/028; F28D 20/025; F28D 20/021; F28D 20/023; F28D 2020/0082
USPC ...................................................... 165/902
See application file for complete search history.

(56) References Cited

U.S. PATENT DOCUMENTS

| | | | | |
|---|---|---|---|---|
| 4,193,441 A | * | 3/1980 | Scaringe | F24H 1/18 126/400 |
| 4,624,242 A | * | 11/1986 | McCall | F24J 2/265 126/586 |
| 6,313,391 B1 | | 11/2001 | Abbott | |

(Continued)

FOREIGN PATENT DOCUMENTS

WO WO 2011088132 A1 * 7/2011 ............. C09K 5/063

OTHER PUBLICATIONS

Feranadez, et al. "Advances in Phase Change Materials for Thermal Solar Power Plants Quality", International Conference on Renewable Energies and Power Quality, Las Palmas de Gran Canaria (Spain), Apr. 13-15, 2010.

*Primary Examiner* — Jason N Thompson
(74) *Attorney, Agent, or Firm* — Thomas | Horstemeyer, LLP

(57) ABSTRACT

In some embodiments, a thermal energy storage system includes multiple thermal energy storage containers adapted to store thermal energy storage media, the containers having high emissivity inner surfaces that are adapted to radiate heat into the stored thermal energy storage media.

3 Claims, 6 Drawing Sheets

(56) References Cited

U.S. PATENT DOCUMENTS

| | | | |
|---|---|---|---|
| 2008/0128121 A1* | 6/2008 | Zhou | F27D 1/042 165/133 |
| 2008/0264602 A1* | 10/2008 | Newberry | F24D 3/165 165/56 |
| 2009/0236079 A1* | 9/2009 | Khodadadi | B82Y 30/00 165/104.21 |
| 2009/0250189 A1* | 10/2009 | Soukhojak | C09K 5/063 165/10 |
| 2011/0067398 A1 | 3/2011 | Slocum et al. | |
| 2011/0146940 A1* | 6/2011 | Golbs | F24D 17/0015 165/10 |
| 2012/0227926 A1* | 9/2012 | Field | F24D 11/003 165/10 |

* cited by examiner

THERMAL ENERGY STORAGE SYSTEMS AND METHODS

CROSS-REFERENCE TO RELATED APPLICATION

This application claims priority to U.S. Provisional Application Ser. No. 61/592,911, filed Jan. 31, 2012, which is hereby incorporated by reference herein in its entirety.

BACKGROUND

It is desirable for some energy production processes to store heat energy for later use. For example, in the case of solar thermal energy processes, energy from the sun is only available for a few hours of the day although demand for energy extends well beyond those hours. Because of this, it is desirable to store the thermal energy obtained during peak sun hours for later use.

Thermal energy is typically stored in thermal energy storage media. The most common type of thermal energy storage media is sensible heat storage media, such as oil or sand. In recent years, phase change materials (PCMs) have been identified as possible thermal energy storage media because they exhibit advantages over the conventional sensible heat storage media. However, there are challenges to the use of PCMs. One such challenge is that it can be difficult to efficiently heat PCM. For example, if a PCM is stored within a container, it may be difficult to melt the material in the center of the container because PCMs often have low thermal conductivity and do not conduct heat well from the container walls to the center of the material. It would be desirable to have systems and methods for storing thermal energy that use PCMs but overcome this heating challenge.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
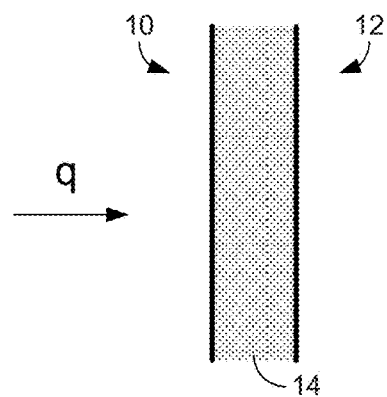
FIG. 1 is a schematic diagram illustrating a heat transfer case involving two black surfaces.

As described above, it can be difficult to melt phase change material (PCM), particularly the portions of the PCM that are spaced from the walls of the container in which the PCM is stored. As described herein, however, more effective heating can be achieved by using radiant heating. In one embodiment, the inner walls of a thermal energy storage container that contains thermal energy storage media have high emissivity surfaces so as to radiate heat energy toward the center of the storage media. In such a case, the portion of storage media located within the center of the container can be heated more effectively. In some embodiments, the thermal energy storage media includes a PCM that is partially or completely transparent to thermal radiation and a radiation absorbing material that absorbs the radiation and heats the PCM.

In the following disclosure, various embodiments of systems and methods are described. It is to be understood that those embodiments are example implementations of the disclosed inventions and that alternative embodiments are possible. All such embodiments are intended to fall within the scope of this disclosure.

Disclosed herein are thermal energy storage systems and methods that, in at least some embodiments, can make efficient high-temperature concentrated solar power (CSP) dispatchable and/or supply advanced nuclear power plants with peaking power capability. By making solar and nuclear power more cost effective and expanding their use, these capabilities reduce the need for expensive power from fossil fuel burning peaking units, lower the overall cost of producing power, reduce fossil fuel imports, and reduce air pollution from fossil fuel combustion.

Some utilities have addressed the need for load leveling by using pumped hydropower, compressed air, or chemical (battery) storage. Thermal storage can expand the use of load leveling because it is more generally applicable, cost effective, and practical than any of those known storage techniques. Presently, nuclear power plants do not employ thermal storage. While some CSP power plants incorporate thermal storage, they typically use sensible heat storage media. Because sensible heat storage media have relatively low specific storage capacities, large amounts of the media are typically required as are large storage tanks to contain the media.

Unlike sensible heat storage media, PCMs have both a solid phase and a liquid phase. When solid PCM is heated to its melting point, the heat is absorbed by the material and it will melt, in which case it changes from its solid phase to its liquid phase. When the liquid PCM is exposed to a heat transfer medium that has a temperature below the melting point, the PCM will transfer its heat energy to the medium and will ultimately freeze, in which case it changes from its liquid phase back to its solid phase. Because of this phase change capability, PCM only needs to be heated to a temperature that is slightly higher than its melting point during charging and can be used to transfer heat to a heat transfer medium at a temperature that is slightly lower than its melting point. In other words, there is a small temperature difference between the charging temperature and the application temperature for PCM. This is in contrast to sensible heat storage media, in which case there is typically a large difference between the charging temperature and the application temperature. In addition, PCMs have much larger specific storage capacities than sensible heat storage media. Because of this, the amount of energy that can be stored by PCM is much greater than that which can be stored by the same amount of sensible heat storage media. This means that less material is needed and smaller and less expensive storage tanks can be used.

While PCMs provide advantages over sensible heat storage media, PCMs have drawbacks. One such drawback is that it can be difficult to efficiently heat PCMs because PCMs have low thermal conductivity. For example, if a PCM is stored within a container, it may be difficult to melt the material in the center of the container because the PCM does not conduct heat well from the container walls.

There is a large difference in the heat transfer rates at high temperatures provided by radiation, conduction, and convection. FIG. 1 illustrates a heat transfer case involving two black surfaces 10 and 12. If it is assumed that the first surface 10 is at a temperature of 820° C., the second surface 12 is at a temperature of 800° C., and the surfaces are separated by 50 mm of sodium chloride 14, the heat transfer rates for radiation, conduction, and convection are:

$q/A = 5.67E-8 \times ((1093\ K)^4 - (1073\ K)^4) = 5762\ W/m^2$     Radiation:

$q/A = (0.6/0.05) \times (820-800) = 240\ W/m^2$     Conduction:

$q/A = 50 \times (820-800) = 1000\ W/m^2$.     Convection:

As can be appreciated from the above heat transfer rates, the heat transferred by radiation is more than 5 times higher than either or both of the other two modes of heat transfer.

The above analysis can be extended to a cylinder containing solid sodium chloride salt. If the walls of the cylinder are heated to a temperature above 800° C., the salt in immediate contact with the walls would acquire heat quickly. On the other hand, the salt at the center of the cylinder would remain relatively cold for a long time because it is insulated by the salt near the cylinder walls. However, if the walls have infrared black inner surfaces, their infrared radiance would penetrate the infrared-transparent salt to convey energy to the center of the material despite the low thermal conductivity of the salt.

Figure 2:
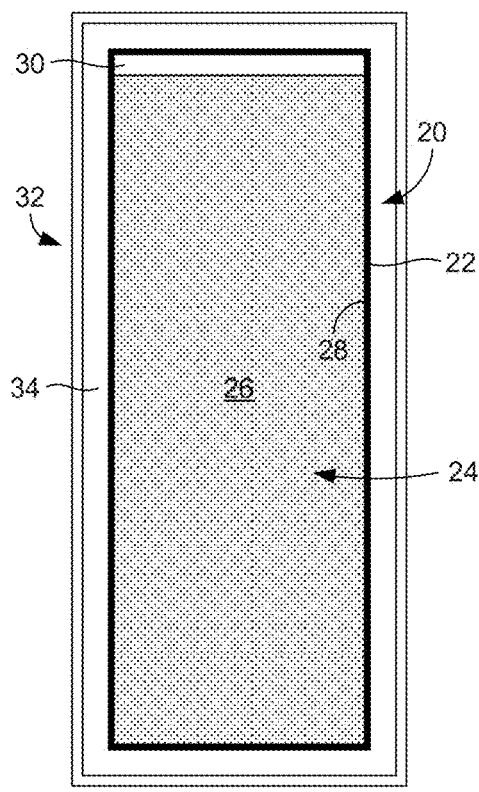
FIG. 2 is a schematic diagram illustrating a first embodiment of a thermal energy storage container.

It can be appreciated from the above discussion that radiant heating could be used to more efficiently heat and melt PCM stored within a container. FIG. 2 is a schematic diagram of an example thermal energy storage container 20 that can be used to heat thermal energy storage media, such as a PCM, using radiant heating. As shown in that figure, the container 20 comprises walls 22 that define an interior space 24 in which thermal energy storage media 26 is contained. In some embodiments, the container 20 is an elongated cylindrical container and the walls 22 are composed of a metal material, such as steel.

The thermal energy storage media 26 can comprise one or more PCMs. In some embodiments, the thermal energy storage media 26 is a salt or salt eutectic. Table 1 provides examples of such materials and further provides an indication of their respective melting points (mp).

TABLE 1

Melting points of salts and salt eutectics

| Compound 1 | mol %1 | Compound 2 | mol %2 | Compound 3 | mol %3 | Compound 4 | mol %4 | mp (° C.) |
|---|---|---|---|---|---|---|---|---|
| NaF | 100 | | | | | | | 995 |
| NaCl | 100 | | | | | | | 800 |
| CaCl$_2$ | 100 | | | | | | | 772 |
| KCl | 100 | | | | | | | 776 |
| MgCl$_2$ | 100 | | | | | | | 708 |
| LiCl | 100 | | | | | | | 610 |
| KCl | 50 | NaCl | | | | | | 658 |
| CaCl$_2$ | 39 | MgCl$_2$ | | | | | | 621 |
| NaCl | 50 | KCl | 50 | | | | | 657 |
| CaCl$_2$ | 26.6 | KCl | | | | | | 600 |
| LiCl | 30 | NaCl | | | | | | 540 |
| CaCl$_2$ | 52.8 | NaCl | | | | | | 500 |
| CaCl$_2$ | 41.6 | KCl | 2.2 | MgCl$_2$ | 8.8 | NaCl | 47.4 | 460 |
| MgCl$_2$ | 40APP | NaCl | | | | | | 450 |
| LiCl | 52.4 | KCl | 11.5 | CaCl$_2$ | 36.1 | | | 412 |
| LiCl | 53.5 | NaCl | 8.5 | KCl | 38 | | | 348 |
| LiCl | 50.5 | KCl | 44.2 | CaCl$_2$ | 5.3 | | | 332 |
| KBr | 28.5 | KCl | 9.5 | LiBr | 46.5 | LiCl | 15.5 | 301 |

The inner surfaces 28 of the walls 22 of the container 20 have high emissivity so as to facilitate radiant heating of the thermal energy storage media 26. By way of example, the inner surfaces 28 have an emissivity of approximately 0.5 to 0.99. In some embodiments, this high emissivity is provided by a dark (e.g., black) layer or coating having high emittance in the infrared and/or visible wavelength range that is provided on the inner surfaces 28. Example coatings include iron sulfide, copper sulfide, molybdenum sulfide, cobalt sulfide, bound carbon, black furnace paint, ferrous oxide, black ceramic, and cobalt oxide. In alternative embodiments, the container 20 can be formed by coating a preformed, compressed PCM pellet with a black or near black material.

As is further shown in FIG. 2, a void 30 is formed within the container 20 above the thermal energy storage media 26. The void 30 enables the thermal energy storage media 26 to expand, for example, when it melts. The void 30 can be occupied by air or another gas. The pressure of gas in the void space would undesirably increase with temperature and with volume reduction as its space is reduced by thermal expansion of the storage media. To address this, the void 30 can in some embodiments be in a vacuum prior to the melting of the thermal energy storage media 26.

With further reference to FIG. 2, the thermal energy storage container 20 is contained within a heat storage tank 32 through which a heat transfer fluid 34, such as oil, can flow. As described below, the heat transfer fluid 34 can be used to transfer heat to and from the thermal energy storage media 26.

Figure 3:
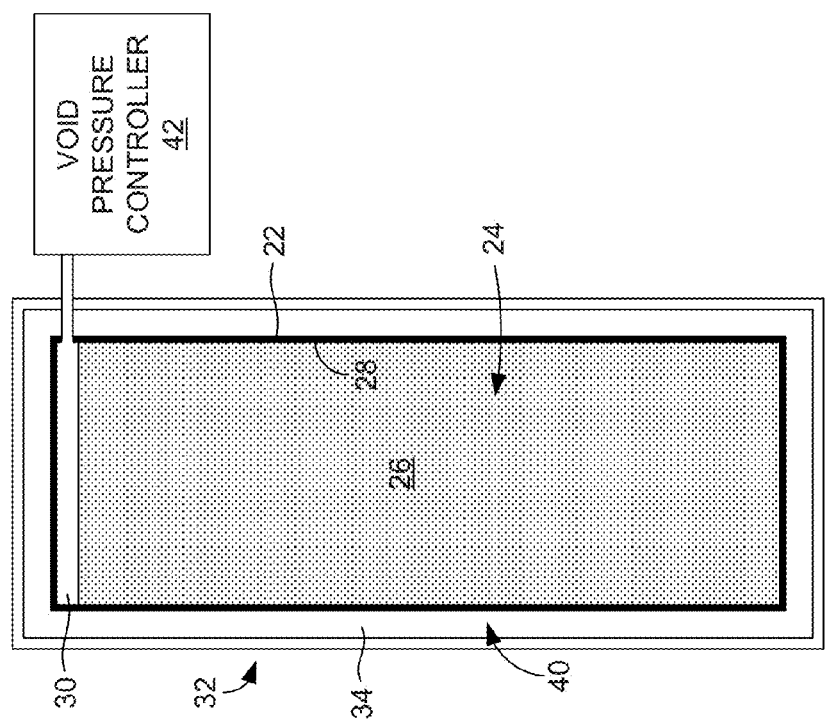
FIG. 3 is a schematic diagram illustrating a second embodiment of a thermal energy storage container.

FIG. 3 illustrates a further embodiment of a thermal energy storage container 40. The container 40 is similar in many ways to the container 20 described above in relation to FIG. 2. Accordingly, the container 40 comprises walls 22 that define an interior space 24 in which thermal energy storage media 26 can be stored. The walls 22 comprise inner surfaces 28 having high emissivity that is, for example, provided by a black or near black inner layer or coating. In addition, a void 30 is formed within the container 40 above the thermal energy storage media 26.

The presence of a void can introduce difficulty in the fabrication of a heat energy storage container. Specifically, if the void is filled with air or another gas, the container must be constructed so as to withstand the high pressure of the gas as it expands. If the void is in a vacuum, container sealing can be difficult and the container must withstand external pressure. In either case, the container walls can be undesirably stressed. The container 40 avoids such issues by including a void pressure controller 42 that maintains the pressure of the void at a constant level, such as atmospheric pressure or the pressure of the heat transfer fluid 34 that surrounds the container 40. In some embodiments, the pressure controller 42 comprises a pressure control tank that contains a material whose vapor pressure at room temperature is the desired pressure within the void 30. Because the thermal energy storage container 40 includes the pressure controller 42, and therefore does not need the strength to resist substantial pressure differences, the walls 22 of the container can be relatively thin.

Many PCMs are partially or completely transparent to thermal radiation, such as infrared radiation. When such PCMs are used in a container such as those described above, the radiance from the high emissivity inner surfaces of the container can pass straight through the PCM to the opposite surface of the container without being significantly absorbed by the PCM. A radiation absorbing material can be added to the PCM in such cases to absorb the radiation and transfer it to the PCM. If the radiation absorbing material is located in the center of the container, it can be used to more quickly heat and melt the PCM in the center.

Figure 4:
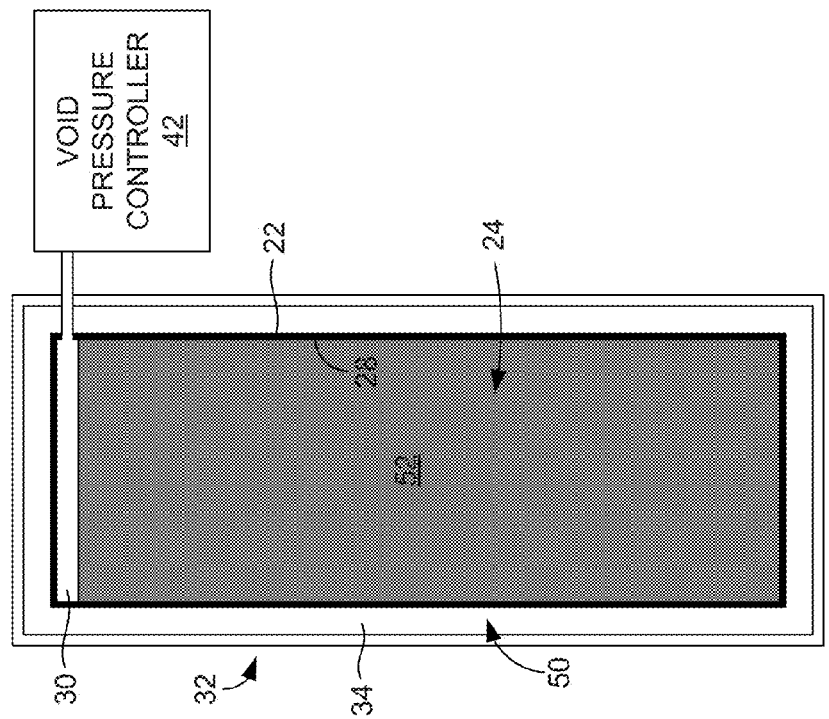
FIG. 4 is a schematic diagram illustrating a third embodiment of a thermal energy storage container.

FIG. 4 shows an embodiment of a thermal energy storage container 50 that includes thermal energy storage media 52 that comprise a PCM seeded with radiation absorbing material. The radiation absorbing material can be dissolved or suspended in the thermal energy storage media 52. In either case, the presence of the radiation absorbing material will result in radiant heat being absorbed by the thermal energy storage media 52. Example radiation absorbing materials include cuprous chloride, ferrous chloride, cobalt chloride, cupric oxide, and suspended carbon.

In some embodiments, the radiation absorbing material can comprise particles (e.g., strands) of material that are dispersed in the thermal energy storage media 52. The use of radiation absorbing particles may provide the additional benefit of suppressing supercooling by providing nucleation sites for precipitation. In some embodiments, the size of the particles is selected to ensure that they do not collect at the top or bottom of the container if they do not have the same density of the PCM in which they are provided. In some embodiments, the particles can have a nominal dimension (e.g., diameter) of 25 nm or less.

A reasonable absorption target for the seeded PCM would be to have approximately 90% of the radiation emitted by a wall of the storage container to be absorbed in approximately 90% of the distance to the opposite wall. The rate of absorption by the seeded PCM can be controlled by adjusting the concentration or optical density, c, of the radiation absorbing material. According to the Beer-Lambert absorption law, the intensity I of a beam passing through an absorbing material varies as:

$$I_x = I_o * \exp(-\mu c x)$$

where x is the path length and μ is the wavelength-dependent absorption coefficient per unit of concentration of the material. The transmittance $I_x/I_o$ exponentially varies with the path length and never reaches zero. The desired absorption coefficient for the seeded PCM will therefore depend upon the size of the container and the temperatures to which the material is exposed. Accordingly, the absorption coefficient of the thermal energy storage media stored in the container can be tailored to suit whatever result is desired, such as nearly total absorption being reached at a distance that coincides with the distance between the walls of the container. In some embodiments, the seeded PCM has an absorption coefficient of approximately 0.5 to 0.99.

Figure 5:
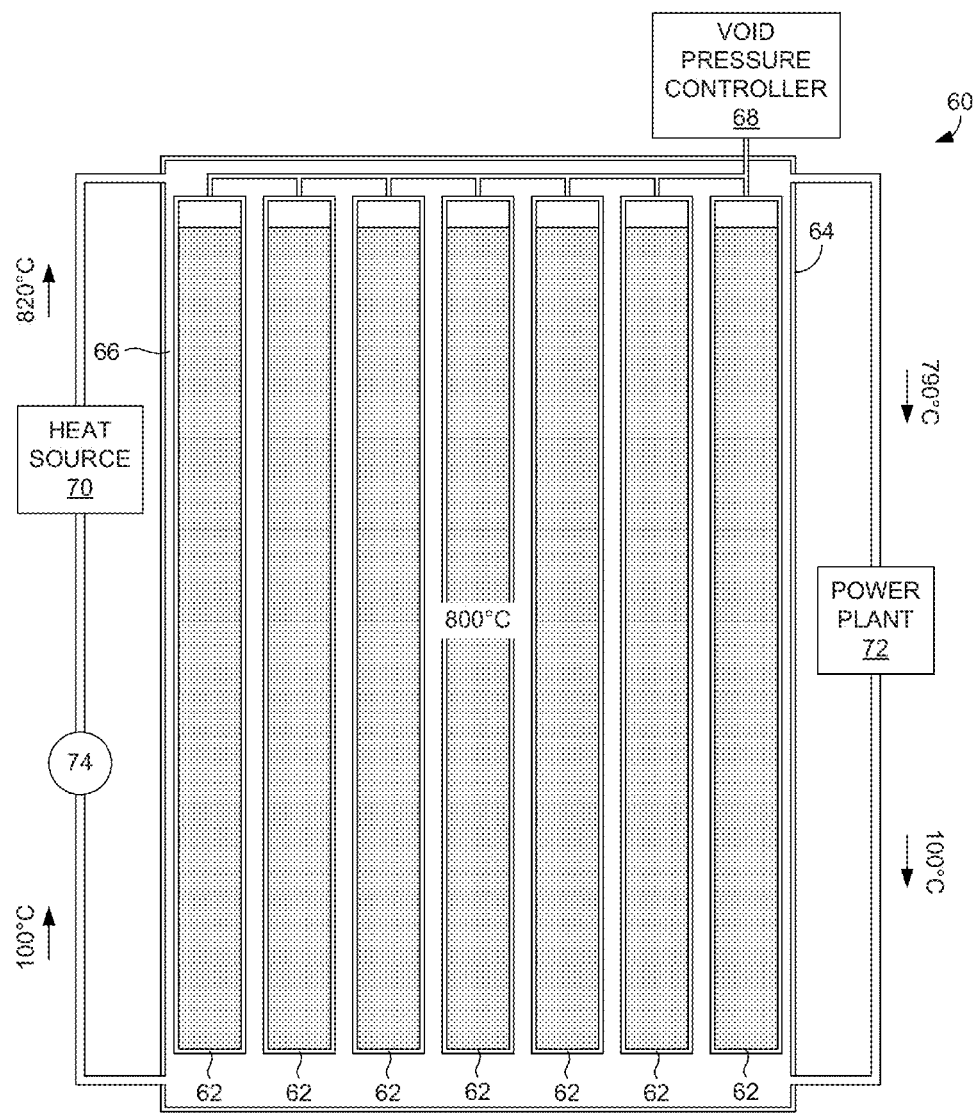
FIG. 5 is a schematic diagram illustrating an embodiment of a thermal energy storage system.

Multiple thermal energy storage containers of the types described above can be combined to form a thermal energy storage system. FIG. 5 illustrates an example of such a system 60. As is shown in that figure, the system 60 includes multiple thermal energy storage containers 62 that have constructions similar to those described above in relation to FIGS. 2-4. Accordingly, each container 62 has a high emissivity (e.g., black) inner surface that can be used to heat the core of a thermal energy storage medium that comprises a PCM and a radiation absorbing material. In the illustrated embodiment, there is a total of seven such containers 62. The containers 62 are themselves contained within a heat storage tank 64. A heat transfer fluid 66 is also contained within the tank 64 and can flow around the outer surfaces of the containers 62 to facilitate heat transfer. As is also shown in FIG. 5, each of the containers 62 is connected to a void pressure controller 68 that facilitates venting the void spaces of the containers to each other and to an external pressure control tank.

The thermal energy storage system 60 further includes a circulation system for reheating and remelting the PCM stored within the containers 62. Energy for reheating the PCM is provided by a heat source 70, which can be a thermal solar plant during the day and/or a nuclear power plant at night. If both sources are used, the storage system 60 can be charged twice a day and discharged to satisfy high morning and evening demand.

Example temperatures for the heat transfer fluid 66 are illustrated in FIG. 5. In this example, it is assumed that the PCM within the containers 62 is sodium chloride having a melting temperature of approximately 800° C. As shown in FIG. 5, the heat source 70 raises the temperature of the heat transfer fluid 66 to approximately 820° C. prior to it entering the top of the heat storage tank 64. Assuming that the containers 62 are cylindrical containers having approximately two-inch diameters, the heat transfer fluid 66 that enters the storage tank 64 will heat and melt the PCM near the top of the containers in about 40 minutes. The PCM near the bottom of the containers 62 will initially be warmed at a slower rate because the heat transfer fluid 66 at the bottom of the tank 64 has been cooled by the PCM at the top. When the top portions of the PCM are saturated, however, the hot heat transfer fluid 66 will pass between the containers 62 to melt lower portions. By way of example, the lower portions will melt in less than an additional 40 minutes because they have been preheated by the warm heat transfer fluid 66 that has previously melted the top portions and because they receive some heat transmitted from the molten PCM. In some embodiments, the tank 64 can be sized so that its PCM charge would melt in a 4- or 6-hour solar day. Alternatively, the tank 64 can be large enough to contain surplus PCM to serve as sensible heat storage media that would provide some additional storage capacity to serve as a buffer against sunless days.

As is further shown in FIG. 5, the heat transfer fluid 66 flows out from the top of the heat storage tank 64 and is delivered to a power plant 72. In the illustrated embodiment, the heat transfer fluid 66 is supplied to the power plant 72 at a temperature of approximately 790° C. After leaving the power plant 72, however, the heat transfer fluid 66 has a temperature of approximately 100° C. The fluid 66 can be drawn back into the bottom of the storage tank 64 and pumped from the bottom of the tank back to the heat source 70 by a pump 74 so that the heat source can reheat the fluid and the process can continue.

Thermal storage at 800° C. is well suited to planned power plant designs. Recently, ultra-supercritical (USC) power plant designs have been introduced to gain greater efficiency. The goal for future designs of USC power plants is to use 760° C. or higher steam temperatures, which translate to an energy conversion efficiency over 50%. In some embodiments, the power plant 72 is a USC power plant.

If a USC power plant demands a 760° C. steam temperature and returns heat transfer fluid at less than 100° C. for reheating, then the temperature differential between the heat transfer fluid input and the freezing PCM is over 700° C. during discharge as opposed to the 20° C. differential when charging. Radiant heat transfer between an 800° C. and a 100° C. black surface is 7.4 W/cm$^2$, so the initial freezing time would be about three minutes compared to the 40 minute initial melting time. As freezing proceeds, a bed of solid sodium chloride forms below the melted sodium chloride with a thermocline temperature of less than 100° C. at the bottom of the tank to near 800° C. at the solid-liquid interface near the center of the tank (see FIG. 5).

Figure 6:
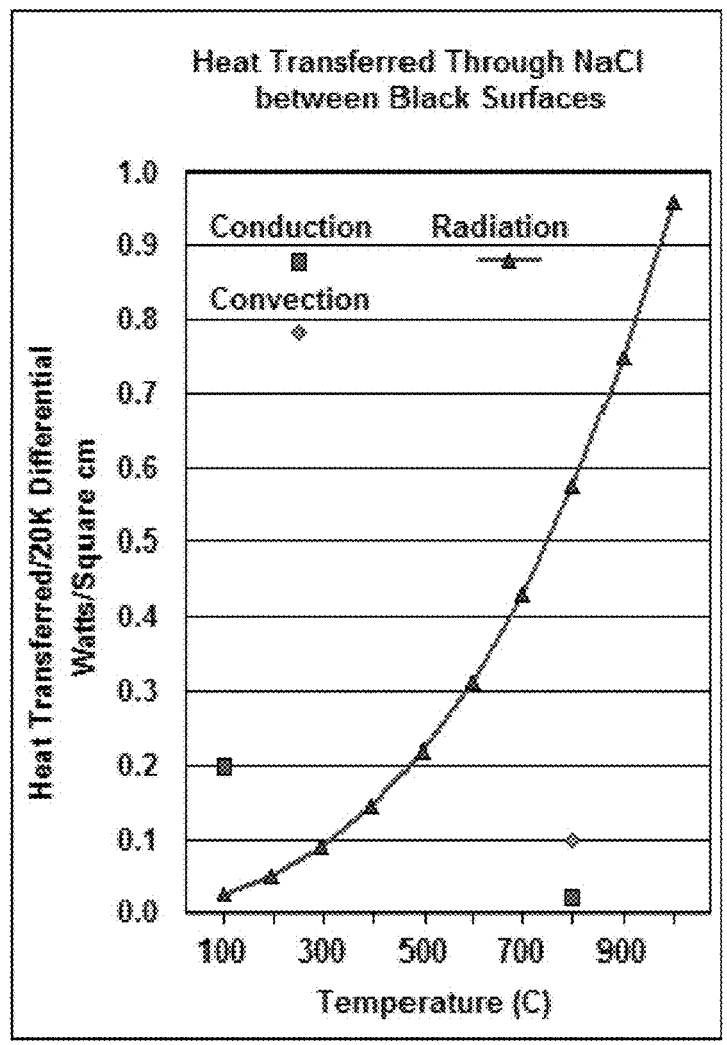
FIG. 6 is a graph that plots heat transferred for sodium chloride placed between black surfaces.

As the thickness of the thermocline increases, more of the energy for heating the heat transfer fluid is derived from the sensible heat of the solid and a varying temperature differential will reflect this change. The heat transfer mechanism also changes with the change of temperature and phase. At a point where the temperature differential is a constant 20° C., the analogy of FIG. 1 can be employed. The result is shown in the graph of FIG. 6. Radiant heat transfer decreases as the temperature is decreased. The thermal conductivity is greater for solid sodium chloride at 100° C. than for molten sodium chloride at 800° C. There is no convective heat transfer in the solid. The net heat transfer rate at 800° C. is about three times as great as at 100° C. if the radiant heat transfer is used. The total thermal energy stored in molten sodium chloride is 68 kJ/mol of which 28 kJ/mol is heat of fusion and 40 kJ/mol is heat of cooling from 800° C. to 100° C. The ratio of phase change to sensible heat transfer can be increased by using segmented systems with a different PCM in each segment.

Figure 7:
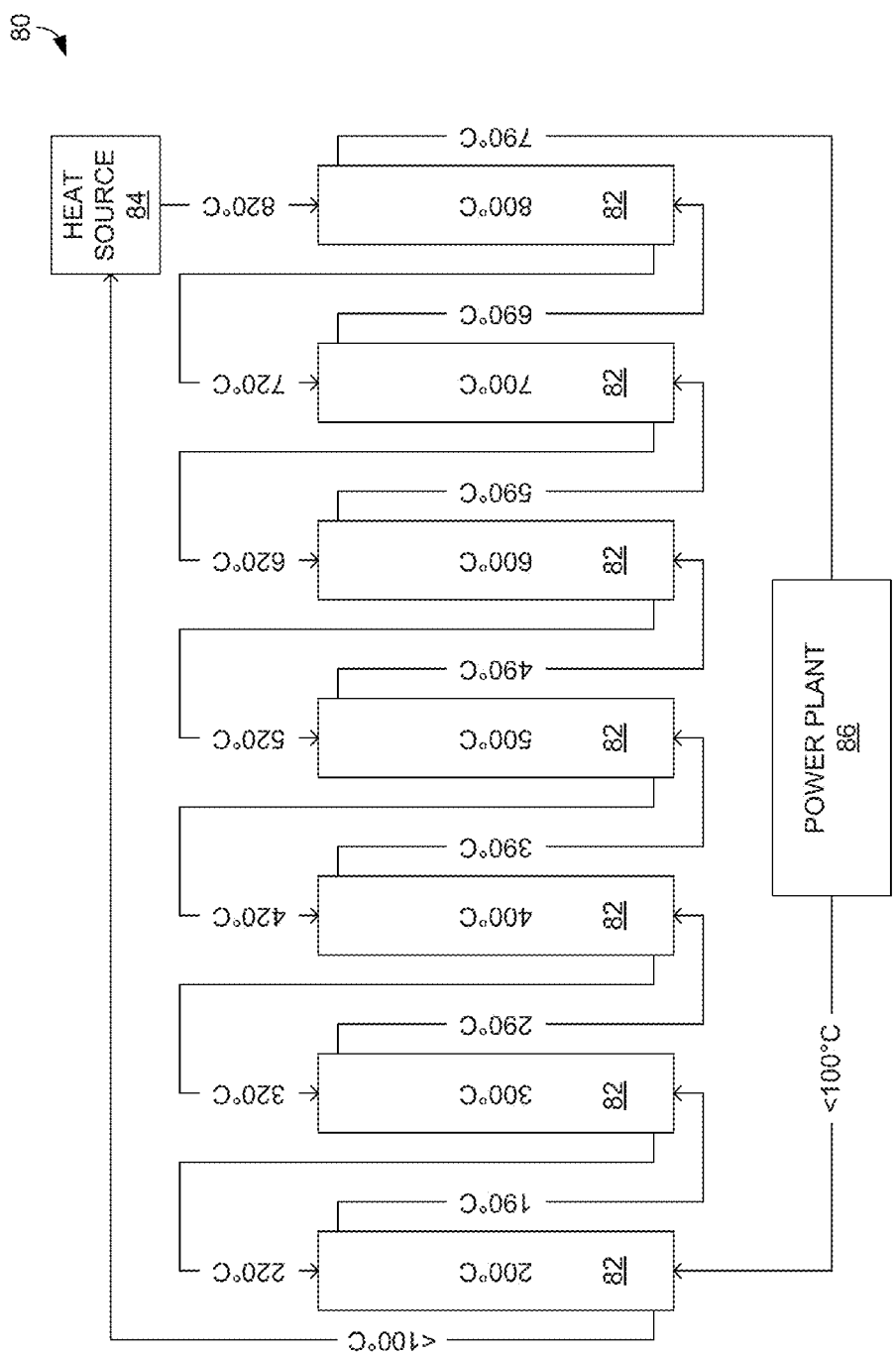
FIG. 7 is a schematic diagram of a first embodiment of a heat storage system that incorporates multiple heat storage segments.

FIG. 7 is a schematic diagram of a heat storage system 80 that comprises multiple segments 82 that each comprises a heat storage tank of the type described in relation to FIG. 5. The system 80 includes a total of seven segments 82. The segments 82 each contain a thermal energy storage media that includes a PCM and a radiation absorbing material. However, the melting point of each segment is different. In the example of FIG. 7, the melting points range from 200° C. to 800° C. in 100° C. increments and the segments 62 are arranged in the order of lowest to highest melting point (see FIG. 7). The thermal energy storage media of the first six segments 62 are reheated by heat transfer fluid supplied by the adjacent higher temperature segment. In the example of FIG. 7, the heat transfer fluid provided to each segment 62 has a temperature that is 20° C. higher than the melting point of the thermal energy storage media that it contains. The thermal energy storage media contained in the last segment 62 (i.e., the highest temperature segment) is reheated by a heat source 84 that similarly supplies heat transfer fluid at a temperature that is 20° C. higher than the thermal energy storage media's melting point.

Cold heat transfer fluid from a power plant 86 flows through each segment 82 of the system 80 in order from the lowest to the highest temperature segment. In each segment 82, the heat transfer fluid's temperature is raised by 100° C. Ultimately, the heat transfer fluid reaches the 800° C. segment where it is supplied by the high quality energy produced by the heat source 84. Each segment 82 provides about 14% of the required reheat energy. Table 2 identifies example PCMs taken from Table 1 that have melting points at or near the nominal temperatures of the PCMs in FIG. 7.

TABLE 2

Melting points of salts and salt eutectics

| Compound 1 | mol %1 | Compound 2 | mol %2 | Compound 3 | mol %3 | Compound 4 | mol %4 | mp(° C.) |
|---|---|---|---|---|---|---|---|---|
| NaCl | 100 | | | | | | | 800 |
| MgCl$_2$ | 100 | | | | | | | 708 |
| CaCl$_2$ | 26.6 | KCl | | | | | | 600 |
| CaCl$_2$ | 52.8 | NaCl | | | | | | 500 |
| LiCl | 52.4 | KCl | | 11.5 | CaCl$_2$ | 36.1 | | 412 |
| KBr | 28.5 | KCl | | 9.5 | LiBr | 46.5 | LiCl | 15.5 | 301 |

A mixture of 72% NaOH and 28% NaCl has a eutectic point at 200° C. and could be used as a PCM at that temperature. NaOH has some infrared transmittance but it is not as uniformly clear as alkali halides. Low melting metals and metal alloys could be used at the lower temperatures where radiant heat transfer is less prominent. Those materials are expensive but their very high thermal conductivity may make them worth the price in the small quantities needed for handling about 14% of the stored energy.

Figure 8:
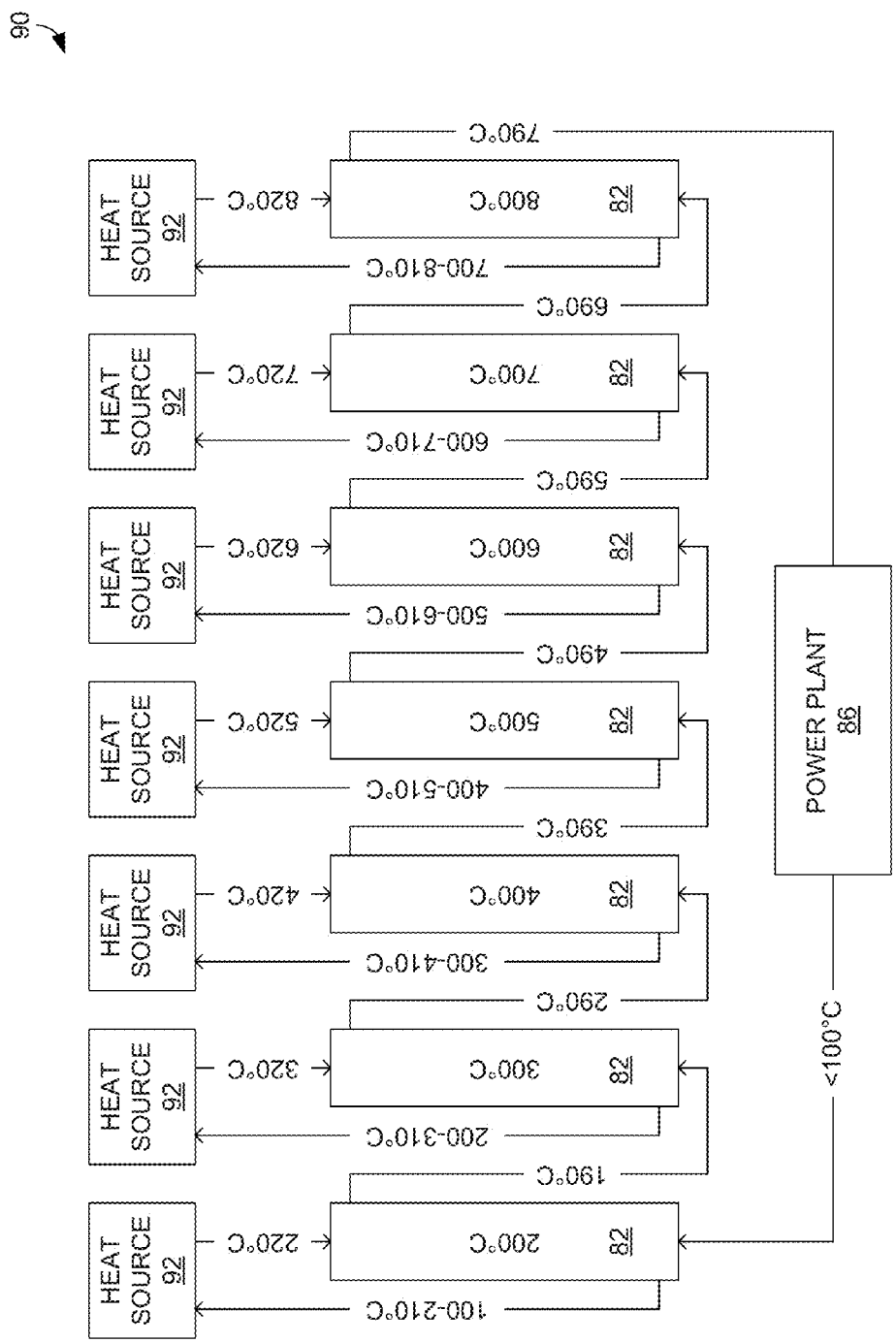
FIG. 8 is a schematic diagram of a second embodiment of a heat storage system that incorporates multiple heat storage segments.

In the heat storage system 80 of FIG. 7, the energy used to reheat the cold heat transfer fluid is high quality energy provided by a high temperature source 84. Such a high temperature source is only needed near the end of the reheating process but it is used for all of it. Solar energy conversion is more efficient at lower temperatures and can be used to provide each segment with its own heat at a temperature just high enough to melt its PCM. Such an arrangement is shown in FIG. 8. That figure shows a heat storage system 90 that also comprises multiple segments 82, each comprising its own heat storage tank similar to the tank shown in FIG. 5. In the system 90, however, reheating is provided to each segment 82 by its own dedicated heat source 92, which can each comprise a solar heater.

The invention claimed is:

1. A thermal energy storage system comprising:
multiple thermal energy storage containers each adapted to store thermal energy storage media, the containers having high emissivity inner surfaces that are adapted to radiate heat into the stored thermal energy storage media, wherein the inner surfaces comprise a black layer or coating having an emissivity of approximately 0.5 to 0.99 and high emittance in the infrared wavelength range, the visible wavelength range, or both, wherein the layer or coating comprises one or more of iron sulfide, copper sulfide, molybdenum sulfide, cobalt sulfide, bound carbon, black furnace paint, ferrous oxide, black ceramic, and cobalt oxide;

thermal energy storage media stored within the storage containers, the storage media in each storage container comprising a salt-based phase change material having a melting point of at least 200 degrees Celsius that is substantially transparent to thermal radiation and radiation absorbing material particles suspended within the phase change material that absorb heat radiated by the inner surfaces, wherein the thermal energy storage media has a radiation absorption coefficient of approximately 0.5 to 0.99, wherein the storage containers are filled such that a void space is formed within each storage container that enables the thermal energy storage media within the storage container to expand, the radiation absorbing material particles comprising one or more of cuprous chloride, ferrous chloride, cobalt chloride, cupric oxide, and suspended carbon and having nominal dimensions of 25 nanometers or less, wherein the storage media is tailored so that nearly total absorption of thermal radiation emitted from the inner surfaces is reached in a distance that coincides with a distance between opposing inner surfaces of the containers;

a venting system adapted to control the pressure within the void spaces of the thermal energy storage containers;

multiple heat storage tanks, each thermal energy storage container being provided in a separate storage tank and containing a thermal energy storage media having a different melting point, the heat storage tanks being arranged in a cascade from highest melting point to lowest melting point; and a circulation system configured to sequentially drive a heat transfer fluid from storage tank to storage tank within the cascade.

2. A method of heating thermal energy storage media, the method comprising:

adding radiation absorbing material particles to thermal energy storage media that includes a salt-based phase change material having a melting point of at least 200 degrees Celsius that is substantially transparent to thermal radiation, the radiation absorbing material particles being adapted to absorb thermal radiation and comprising one or more of cuprous chloride, ferrous chloride, cobalt chloride, cupric oxide, and suspended carbon and having nominal dimensions of 25 nanometers or less, wherein the thermal energy storage media has a radiation absorption coefficient of approximately 0.5 to 0.99;

filling a storage container having high emissivity inner surfaces with the thermal energy storage media such that a void space is formed within the storage container that enables the thermal energy storage media to expand, wherein the high emissivity inner surfaces are adapted to radiate heat into the thermal energy storage media and comprise a black layer or coating having an emissivity of approximately 0.5 to 0.99 and high emittance in the infrared wavelength range, the visible wavelength range, or both, wherein the layer or coating comprises one or more of iron sulfide, copper sulfide, molybdenum sulfide, cobalt sulfide, bound carbon, black furnace paint, ferrous oxide, black ceramic, and cobalt oxide;

providing the storage container within a heat storage tank that contains a heat transfer fluid in which the storage container is immersed;

heating the heat transfer fluid so that the inner surfaces of the storage container radiate heat into a center of the thermal energy storage media;

wherein the thermal energy storage media is tailored so that nearly total absorption of thermal radiation emitted from the storage container inner surfaces is reached in a distance that coincides with a distance between opposing inner surfaces of the storage container.

3. The method of claim 2, further comprising filling multiple other storage containers with salt-based thermal energy storage media in a manner in which each storage container contains a thermal energy storage medium having a different melting point, providing each storage container in a separate heat storage tank to create a cascade in which the storage tanks are sequentially arranged from highest melting point to lowest melting point, and driving the heat transfer fluid from storage tank to storage tank in the cascade.

* * * * *